United States Patent [19]

Scherzer et al.

[11] Patent Number: 4,512,961

[45] Date of Patent: Apr. 23, 1985

[54] DEALUMINATION OF FAUJASITE-TYPE ZEOLITES USING ION EXCHANGE RESINS

[75] Inventors: Julius Scherzer, Anaheim; Adrian P. Humphries, Claremont, both of Calif.

[73] Assignee: Harshaw/Filtrol, Oakland, Calif.

[21] Appl. No.: 525,511

[22] Filed: Aug. 22, 1983

[51] Int. Cl.³ .............................................. C01B 33/28
[52] U.S. Cl. ........................................ 423/328; 502/79
[58] Field of Search ............... 423/328; 502/60, 77–79

[56] References Cited

U.S. PATENT DOCUMENTS 3,442,795  5/1969  Kerr et al. ..................... 502/85 X
3,493,519  2/1970  Kerr et al. ..................... 502/79 X
4,093,560  6/1978  Kerr et al. ..................... 423/328 X Primary Examiner—Edward J. Meros
Attorney, Agent, or Firm—Andrew E. Barlay

[57] ABSTRACT

Faujasite-type zeolites of high catalytic activity, low coke-forming property and stable crystalline structure are prepared by using a combination of hydrothermal treatment and ion exchange resin removal of aluminum from the crystalline structure of the zeolites. The process allows for a substantial increase of the silica-to-alumina ratio in the zeolite without detrimentally affecting the strength of the structure.

3 Claims, No Drawings

DEALUMINATION OF FAUJASITE-TYPE ZEOLITES USING ION EXCHANGE RESINS

BACKGROUND OF THE INVENTION

Cracking catalysts based on rare earth metal exchanged faujasitic zeolites are well known in the art. These rare earth metal exchanged zeolites generally exhibit high activity and stability and are being preferentially employed in fluid catalytic cracking (FCC) processes. These properties are obtained by substituting some of its sodium content with other metals, hydrogen, or ammonium. Further enhancement of FCC properties can be achieved by rearrangement of the zeolite structure by high temperature treatment of the zeolite with steam which will cause a portion of the framework aluminum to migrate into nonframework positions. Removal of the aluminum from framework positions to nonframework positions produces an ultrastable zeolite of high thermal and hydrothermal stability. These nonframework aluminum atoms can then be removed from the crystalline structure by treatment with caustic, acids, such as HCL, or with salts, for example, $Na_2H_2EDTA$, thereby resulting in an increased silica-to-alumina ratio preferred in fluid catalytic cracking operations.

Preparations of dealuminated zeolites of the faujasite type have already been described in several publications. Thus, an article in the Journal of Catalysis, 54, pp. 285–288 (1978) by J. Scherzer provides a detailed discussion of methods involving the preparation of highly stable dealuminated zeolites. Also, in U.S. Pat. No. 4,218,307 (McDaniel), dealumination of faujasitic zeolite using hydrothermal treatment and mineral acids is disclosed.

In most of these prior art methods, dealumination is accomplished by the use of chemicals which may damage the crystal structure of the treated zeolite, and thus reduce the stability of the zeolite. Application of EDTA for dealumination is a milder method for aluminum removal; however, from an economic point of view, it is impractical due to its relatively high cost and its limited ability to remove nonframework aluminum.

It has now been found that acid-type ion exchange resins can readily accomplish the dealumination without detrimentally affecting the structural strength of the exchanged zeolite. In addition, the treatment is simple and economic, resulting in a dealuminated zeolite of high activity and stability, low coke-forming properties, and a high silica-to-alumina ratio.

SUMMARY OF THE INVENTION

A process is provided for the dealumination of faujasitic zeolites by subjecting crystalline aluminosilicate zeolites to a hydrothermal treatment at elevated temperatures followed by contacting the thermally treated zeolite in an aqueous medium with an acid-type ion exchange resin for a time sufficient to allow exchange of at least a portion of the nonframework aluminum of the zeolite. The dealuminated zeolite can then be used as is or can be treated with metal salts, such as rare earth metal salts, to obtain a rare earth metal exchanged dealuminated zeolite.

DETAILED DESCRIPTION OF THE INVENTION

This invention relates to the preparation of dealuminated faujasitic zeolites of high catalytic activity, stability, and low coking property. More specifically, it concerns a process of preparing dealuminated faujasitic zeolites by subjecting the zeolite to a hydrothermal treatment followed by removal of aluminum from the zeolite by treating it with an acidic-type ion exchange resin.

For the purposes of this invention, the term "faujasitic" or "faujasite-type zeolite" refers to a zeolite of the Y-type, described in detail in ACS Monograph 171, "Zeolite Chemistry and Catalysis" (1976) edited by Jule A. Rabo.

The term "dealumination" refers to the removal of aluminum atoms from the alumino-silicate zeolite by replacement with atoms other than aluminum.

The term "acid-type ion exchange resin" as used herein refers to an insoluble and infusible polymer having exchangeable active acidic groups. These ion exchange resins are commercially available, and the active, exchangeable acidic groups can exhibit strong, intermediate, and weakly acidic characteristics depending upon the requirements of the user. Typical commercially available acidic ion exchange resins which can be utilized in the instant invention include those marketed under the trade names of Duolite, Dowex, Amberlite, and Ionac.

In the instant process, sodium-containing Y-zeolite starting material having a silica-to-alumina molar ratio in the crystal structure from about 4.5 to about 5.0 is being utilized. This sodium-containing Y-zeolite, hereinafter Na-Y zeolite, is partially ammonium exchanged by contacting the Na-Y with $(NH_4)_2SO_4$ at a dosage level from about 50% to about 100%, preferentially from about 65% to about 75%, at a temperature from ambient to 100° C., preferentially in the range from about 80° to about 90° C., for a period of ½ to 2 hours, preferentially 1 hour to 1½ hours. The material is then washed, filtered, and subsequently subjected to a hydrothermal treatment by arranging the zeolite in a fixed bed configuration to a depth of at least 3 inches (about 7.6 cm), and maintaining it at a temperature from about 500° to 900° C., preferably from about 700° to about 800° C. for a period of 1 to 5 hours, preferably 2 to 4 hours. This physical arrangement of zeolite during calcination induces a self-steaming effect by slightly delaying the escape of gaseous products and is essential to this process. If a still lower level of Na is desired, the above procedure can be repeated. This hydrothermal treatment serves to remove aluminum from framework positions and simultaneously induce a structural rearrangement in the remaining framework, thereby eliminating the vacancies left by the dealumination. This type of rearrangement is essential for the subsequent removal of aluminum under very mild conditions. The milder these conditions are, the more likely that the integrity of the crystal lattice, and hence its thermal stability, will be maintained.

The hydrothermally treated material is then held in intimate contact with an acid ion-exchange resin for an extended period of time. Exchange resin in its acidic form permits direct acid exchange via an infinitely dilute acidic medium. During this contact, not only the aluminum, but all types of cations are subject to exchange with $H^+$. Sodium, which is quite deleterious to the petroleum cracking process is efficiently removed. The ion-exchange resin that proved quite effective for these purposes is Dowex 50W-X8 ($H^+$ form) Dowex 50W-X8($H^+$ form) is a strong acid cation exchange resin of the sulfonated polystyrene type, in the hydrogen form, wherein the polystyrene is 8% cross-linked.

The actual exchange procedure entails contacting the hydro-thermally treated zeolite with the resin in an aqueous slurry. Enough water is added to the zeolite to make a 10% solids slurry to which is added the resin in a weight ratio of resin to zeolite from 0.5:1 to 10:1, preferably from 3:1 to 5:1 at a temperature of from ambient to 100° C. The time required for the exchange is in the range from about ½ to about 24 hours, under optimum conditions from about 2 to about 4 hours. The slurry is continually agitated during this period of contact.

Since the exchange resin particles are of substantially large size compared to the zeolite particles, separation is easily achieved, for example, by screening. A 60-mesh screen effectively accomplishes such a separation. The zeolite is then filtered and subsequently dried; alternatively, the zeolite can be used in further formulations as a filter cake. Other conventional separation methods can be equally utilized. Higher ratios of resin to zeolite, higher temperatures and longer contact time increase the extent of dealumination.

The effectiveness of a dealumination procedure is measured in a number of ways. The amount of aluminum actually removed is the major consideration. Na-Y zeolites normally have a $SiO_2/Al_2O_3$ molar ratio of from about 4.5 to 5.0. A $SiO_2/Al_2O_3$ molar ratio of greater than 8.0 is easily achievable with the above-described process. Equally important is the retention of crystallinity, and this is normally gauged by the peak strength of the 31° peak of an XRD scan as measured on a Phillips XRG-3000 electronics instrument equipped with a copper tube. This exchange procedure yields no significant change in this respect. Surface area is also indicative of the condition of the crystal lattice. A typical NaY surface area prior to exchange is about 650 m$^2$/g to 700 m$^2$/g, and no significant decrease is shown due to the exchange process utilized herein. Sodium content which is expressed in weight percent $Na_2O$ typically is reduced from approximately 3% $Na_2O$ of the ammonium-exchanged NaY to below 0.2% by the use of the present invention.

The dealuminated zeolite can then be conventionally treated, for example by incorporating it in a matrix as a catalyst, with any number of and combination of ion exchanges, for example, rare earth metals, and any other treatments common to the art.

The following examples will further show the novel aspects of the invention.

The starting material in all cases was a commercial sample of Na-Y zeolite, $Na_{56}(AlO_2)_{56}(SiO_2)_{136}.250 H_2O$. A commercially available ion-exchange resin, Dowex 50W-X8 (H+ form) was used for the treatment.

EXAMPLE I

A quantity of Na-Y zeolite starting material was partially ammonium exchanged, resulting in NH$_4$, Na-Y zeolite containing 3.28 wt % $Na_2O$. This zeolite was subsequently calcined at 760° C. for 3 hours under self-steaming (deep bed) conditions. The product is stabilized Y-zeolite, type α, hereinafter referred to as α-Y.

This material was subjected to chemical analysis, surface area and unit cell size determination, and XRD.

30 g (volatile-free basis) of α-Y were stirred with 30 g of ion-exchange resin in 300 g deionized water and held at ambient temperature (~20° C.) for 18 hours. The resin was then separated from the slurry with a 60-mesh sieve and the zeolite was subjected to the analyses described above.

Another 30 g (volatile-free basis) of α-Y were stirred with 30 g of ion-exchange resin in 300 g of deionized water and held at a temperature of 100° C. for 18 hours. The resin was then separated from the slurry with a 60-mesh sieve and the zeolite was subjected to the analyses described above. The results are shown in Table I.

EXAMPLE II 30 g (volatile-free basis) of α-Y prepared in Example I were stirred with 60 g of ion-exchange resin in 300 g of deionized water and held at a temperature of 100° C. for 18 hours. The resin was then separated from the slurry with a 60-mesh sieve and the zeolite was subjected to the analyses.

The 30 g of exchanged zeolite were then mixed with another 60 g of ion exchange resin in 300 g of deionized water and held at a temperature of 100° C. for 18 hours. The resin was separated from the slurry with a 60-mesh sieve and the zeolite was subjected to the analyses.

30 g of the twice-exchanged zeolite were mixed with yet another 60 g of ion exchange resin in 300 g of deionized water and held at a temperature of 100° C. for 18 hours. The resin was separated from the slurry with a 60-mesh sieve and the zeolite was subjected to the analyses. The results are shown in Table I.

EXAMPLE III 30 g (volatile-free basis) of α-Y prepared in Example I were stirred with 60 g of ion-exchange resin in 300 g of deionized water and held at a temperature of 100° C. for 1 hour. The resin was separated from the slurry with a 60-mesh sieve and the zeolite was subjected to the analyses.

Another 30 g (volatile-free basis) of α-Y were stirred with 60 g of ion-exchange resin and held at a temperature of 100° C. for 2 hours. The resin was separated from the slurry with a 60-mesh sieve and the zeolite was subjected to the analyses. The results are shown in Table I.

EXAMPLE IV 30 g (volatile-free basis) of α-Y prepared in Example I were stirred with 90 g of ion-exchange resin in 300 g of deionized water and held at a temperature of 100° C. for 1 hour. The resin was separated from the slurry with a 60-mesh sieve and the zeolite was subjected to the analyses.

Another 30 g (volatile-free basis) of α-Y were stirred with 90 g of ion-exchange resin in 300 g of deionized water and held at a temperature of 100° C. for 2 hours. The resin was separated from the slurry with a 60-mesh sieve, and the zeolite was subjected to analysis. The results are shown in Table I.

EXAMPLE V 30 g (volatile-free basis) of α-Y prepared in Example I were stirred with 150 g of ion-exchange resin in 300 g of deionized water and held at a temperature of 100° C. for 1 hour. The resin was separated from the slurry with a 60-mesh sieve and the zeolite was subjected to the analyses.

Another 30 g (volatile-free basis) of α-Y were stirred with 150 g of ion-exchange resin in 300 g of deionized water and held at a temperature of 100° C. for 2 hours. The resin was separated from the slurry with a 60-mesh sieve and the zeolite was subjected to the analyses. The results are shown in Table I.

EXAMPLE VI 30 g (volatile-free basis) of α-Y prepared as in Example I were stirred with 150 g of ion-exchange resin in 300 g of deionized water and held at a temperature of 100° C. for 2 hours. The resin was then separated from the slurry with a 60-mesh sieve, and the zeolite was subjected to the analyses.

The 30 g of exchanged zeolite were then mixed with another 150 g of ion-exchange resin in 300 g of deionized water and held at a temperature of 100° C. for 2 hours. The resin was then separated from the slurry with a 60-mesh sieve and the zeolite was subjected to the analyses. The results are given in Table I.

This procedure entails the preferred embodiment of this invention.

EXAMPLE VII

A quantity of Na-Y zeolite starting material was partially ammonium exchanged, resulting in NH4, Na-Y zeolite with 3.28 wt % Na2O, and subsequently calcined at 540° C. for 2 hours under self-steaming (deep bed) conditions. This material was partially ammonium exchanged again, further reducing the Na2O level to 1.12 wt %, and finally calcined at 815° C. for 3 hours under the same conditions. This product is stabilized Y zeolite, type β, hereinafter referred to as β-Y. This material was subjected to chemical analysis, surface area, and unit cell size determination and XRD.

30 g (volatile-free basis) of β-Y were stirred with 30 g of ion-exchange resin in 300 g of deionized water and held at ambient temperature (~20° C.) for 18 hours. The resin was then separated from the slurry with a 60-mesh sieve, and the zeolite was subjected to the analyses described above.

Another 30 g (volatile-free basis) of β-Y were stirred with 30 g of ion-exchange resin in 300 g of deionized water and held at a temperature of 100° C. for 18 hours. The resin was then separated from the slurry with a 60-mesh sieve, and the zeolite was subjected to the analyses. The results are shown in Table II.

As is readily apparent from the foregoing data, the reduction of aluminum in this zeolite can be accomplished with only a minimal alteration of the crystal structure.

TABLE I

| | Exchange Zeolite:Resin (V.F.:as is) | Temp. (°C.) | Time (hrs.) | $SiO_2/Al_2O_3$ (molar) | Surface Area ($m^2$) | Unit Cell (Å) | 31° | $Na_2O$ (wt. %) |
|---|---|---|---|---|---|---|---|---|
| Na—Y | | | | 4.7 | 695 | 24.68 | | 13.7 |
| α-Y | | | | 4.7 | 654 | 24.53 | 38 | 3.28 |
| Example I | 1:1 | 20° | 18 | 5.5 | | 24.55 | 27 | 1.94 |
| | 1:1 | 100° | 18 | 5.6 | 587 | 24.55 | 29 | |
| Example II | 1:2 | 100° | 18 | 6.73 | 651 | 24.53 | 33 | 1.27 |
| | 1:2* | 100° | 18 | 8.47 | 698 | 24.51 | 41 | 0.30 |
| | 1:2** | 100° | 18 | 9.50 | 704 | 24.49 | 42 | 0.11 |
| Example III | 1:2 | 100° | 1 | 5.3 | 607 | 24.56 | 28 | 0.32 |
| | 1:2 | 100° | 2 | 6.0 | 600 | 24.55 | 29 | 0.32 |
| Example IV | 1:3 | 100° | 1 | 6.3 | 650 | 24.57 | 29 | 0.30 |
| | 1:3 | 100° | 2 | 6.4 | 660 | 24.58 | 30 | 0.30 |
| Example V | 1:5 | 100° | 1 | 7.8 | 624 | 24.50 | 34 | 0.25 |
| | 1:5 | 100° | 2 | 9.2 | 625 | 24.48 | 33 | 0.19 |
| Example VI | 1:5 | 100° | 2 | 7.9 | 657 | 24.51 | 35 | 0.21 |
| | 1:5* | 100° | 2 | 8.3 | 670 | 24.50 | 36 | 0.05 |

*Double Exchange
**Triple Exchange

TABLE II

| | Exchange Zeolite:Resin (V.F.:as is) | Temp. (°C.) | Time (hrs) | $SiO_2/Al_2O_3$ (Molar) | Surface Area ($m^2$) | Unit Cell (Å) | 31° | $Na_2O$ (wt. %) |
|---|---|---|---|---|---|---|---|---|
| Na—Y | | | | 4.7 | 695 | 24.68 | | 13.7 |
| β-Y | | | | 4.9 | 503 | 24.34 | 28 | 1.12 |
| Example VII | 1:1 | 20° | 18 | 6.1 | | 24.37 | 31 | 0.74 |
| | 1:1 | 100° | 18 | 6.7 | 542 | 24.38 | 33 | |

We claim:

1. In the process of producing a dealuminated crystalline alumino-silicate zeolite of the Y-type by hydrothermally treating the zeolite to transfer a portion of its framework aluminum content to a nonframework position, followed by treatment to reduce nonframework aluminum content, carrying out the treatment to reduce nonframework aluminum content by a process comprising the steps of
   (a) preparing an aqueous slurry of the hydrothermally treated zeolite,
   (b) contacting the slurry with a strong acid cation exchange resin of the sulfonated polystyrene type in the hydrogen form in a resin to zeolite weight ratio ranging from 3:1 to 5:1 at a temperature of 100 degrees C. and for a time ranging from 1 to 4 hours, and
   (c) recovering zeolite of increased silica to alumina ratio, reduced sodium content and high structural strength.

2. Process as recited in claim 1 wherein the hydrothermal treatment is carried out by arranging the zeolite in a fixed bed configuration to a depth of at least 3 inches and maintaining it at self steaming conditions at a temperature ranging from about 500 to 900 degrees C. for a period of 1 to 5 hours.

3. Process as recited in claim 2 wherein the hydrothermal treatment is carried out at a temperature ranging from about 700 degrees C. to about 800 degrees C. for a period of 2 to 4 hours.

* * * * *